United States Patent
Ou

(10) Patent No.: US 12,502,026 B1
(45) Date of Patent: Dec. 23, 2025

(54) HEATING LUNCH BOX

(71) Applicant: Zhenfei Ou, Guangdong (CN)

(72) Inventor: Zhenfei Ou, Guangdong (CN)

( * ) Notice: Subject to any disclaimer, the term of this patent is extended or adjusted under 35 U.S.C. 154(b) by 0 days.

(21) Appl. No.: 19/209,626

(22) Filed: May 15, 2025

(51) Int. Cl.
| | |
|---|---|
| *A47J 36/04* | (2006.01) |
| *A45C 11/20* | (2006.01) |
| *A47J 36/24* | (2006.01) |
| *A47J 47/02* | (2006.01) |
| *F25B 21/02* | (2006.01) |
| *F25D 11/00* | (2006.01) |

(52) U.S. Cl.
CPC ........... *A47J 36/2483* (2013.01); *A45C 11/20* (2013.01); *A47J 47/02* (2013.01)

(58) Field of Classification Search
CPC ........ A47J 36/2483; A47J 47/02; A45C 11/20
See application file for complete search history.

(56) References Cited

U.S. PATENT DOCUMENTS

2020/0189826 A1* 6/2020 Alexander .......... A47J 36/2483
2020/0278152 A1* 9/2020 Lindsay .................... F27B 5/18

FOREIGN PATENT DOCUMENTS

JP        2019063557 A  *  4/2019  .......... H02J 7/00302

* cited by examiner

*Primary Examiner* — Edward F Landrum
*Assistant Examiner* — Kuangyue Chen

(57) ABSTRACT

A heating lunch box includes a base and a food container. The food container is used for holding food. The base includes an outer shell, a circuit board, a first heating member, a second heating member, and an inner container. The circuit board, the first heating member, the second heating member, and the inner container are arranged inside the outer shell. The inner container is used for heat conduction. The first heating member and the second heating member are both electrically connected to the circuit board. A receiving slot with an opening at a top portion thereof is defined in the inner container. The first heating member is disposed at a bottom portion of the inner container. The second heating member is disposed on an outer side wall of the inner container. A top portion of the inner container does not protrude from a top surface of the outer shell.

19 Claims, 11 Drawing Sheets

HEATING LUNCH BOX

TECHNICAL FIELD

The present invention relates to the technical field of daily necessities, particularly to a heating lunch box.

BACKGROUND ART

At present, existing heating lunch boxes generally include a food container for holding food and a base with a receiving slot. The food container is placed in the receiving slot. The base is equipped with a heat-conducting member at a bottom portion of the receiving slot and a heating member below the heat-conducting member. The heating member is used for heating, and the heat-conducting member conducts the temperature of the heating member to the food container to achieve heating of the food inside the food container. At present, for the existing heating lunch boxes, heating is usually only carried out at the bottom portion of the food container, with a slow heating speed, and it is difficult to heat at a position far away from the bottom portion of the food container, resulting in poor food heating effect and affecting the user experience.

SUMMARY

The main objective of the present invention is to provide a heating lunch box for solving issues caused by heating only the bottom portion in current heating lunch boxes such as slow heating speed and insufficient heat transfer to positions far from the bottom of a food container.

In order to solve the above technical issues, a technical solution has been developed in the present invention and described as follows.

A heating lunch box includes a base and a food container. The food container is used for holding food. The base includes an outer shell, a circuit board, a first heating member, a second heating member, and an inner container. The circuit board, the first heating member, the second heating member, and the inner container are arranged inside the outer shell. The inner container is used for heat conduction. The first heating member and the second heating member are both electrically connected to the circuit board.

A receiving slot is defined in the inner container. A top portion of the receiving slot is an opening. The first heating member is disposed at a bottom portion of the inner container, and the second heating member is disposed on an outer side wall of the inner container. A top portion of the inner container does not protrude from a top surface of the outer shell.

Furthermore, the base further includes a first temperature detection unit arranged inside the outer shell. The circuit board is electrically connected to the first temperature detection unit. The first temperature detection unit is used for detecting a temperature of one of the inner container, the first heating member, and the second heating member.

Furthermore, the first temperature detection unit is arranged at a bottom portion of the inner container for detecting a heating temperature of the first heating member or a temperature of the bottom portion of the inner container.

The base further includes a second temperature detection unit arranged inside the outer shell. The second temperature detection unit is electrically connected to the circuit board. The second temperature detection unit is arranged on an outer side wall of the inner container. The second temperature detection unit is used for detecting a heating temperature of the second heating member or a temperature of a side wall of the inner container.

Furthermore, the second heating member is a flexible heating sheet. A total number of the second heating members is one, and the second heating member is arranged around the outer side wall of the inner container.

Furthermore, a total number of the second heating members is multiple, and the second heating members are arranged around the outer side wall of the inner container.

Furthermore, the first heating member occupies at least one-third of a bottom surface area of the inner container.

Furthermore, a total number of the second temperature detection units is one.

Furthermore, a total number of the second temperature detection units is multiple, and the second temperature detection units are distributed around the outer side wall of the inner container.

Furthermore, the second temperature detection unit is arranged at a position higher than half of a height of the outer side wall of the inner container.

Furthermore, the circuit board is configured for controlling the activation and deactivation of the first heating member according to a first temperature signal fed back by the first temperature detection unit. The circuit board is configured for controlling the activation and deactivation of the second heating member based on a second temperature signal fed back by the second temperature detection unit.

Furthermore, the circuit board is configured for simultaneously controlling the activation and deactivation of the first heating member and the second heating member based on one of a first temperature signal fed back by the first temperature detection unit and a second temperature signal fed back by the second temperature detection unit.

Furthermore, the outer shell includes an outer cover and a front frame connected to the outer cover. The front frame is positioned at a top portion of the outer cover. The inner container is positioned on an inner side of the outer shell and below the front frame.

Furthermore, an outer peripheral side of the front frame extends downward to form an outer surrounding wall. A top portion of the outer cover is provided with an insertion slot, and a side wall of the insertion slot is provided with an engaging block. The outer surrounding wall is provided with an engaging opening. At least one part of the outer surrounding wall is placed in the insertion slot. The engaging block is placed in the engaging opening.

Furthermore, the inner container includes a heat-conducting bottom plate, a heat-conducting surrounding wall extending upward from a circumferential side of the heat-conducting bottom plate, and an outer rim extending outward from a top portion of the heat-conducting surrounding wall. A position limiting slot is defined in a bottom surface of the front frame. The outer rim is placed inside the position limiting slot.

Furthermore, a bottom portion of the front frame is equipped with positioning columns, and the outer rim is provided with positioning holes at positions corresponding to the positioning columns. The positioning columns pass through the positioning holes. The base further includes pressing members, and the pressing members are sleeved onto the positioning columns to press the outer rim onto the front frame.

Furthermore, the outer cover includes a shell body connected to the front frame, and a cover body connected to the shell body. The shell body, the front frame, and the inner container surround to form a first cavity. The shell body and the cover body are connected to form a second cavity. A wire passing hole is defined in the shell body. The circuit board is disposed in the second cavity. The first heating member and the second heating member are both positioned in the first cavity.

Furthermore, the base further includes a battery. The battery is arranged in the second cavity and electrically connected to the circuit board.

The shell body or the cover body is provided with charging interfaces for connecting to an external power supply. The charging interface is electrically connected to the circuit board.

Furthermore, the second cavity includes a first sub-cavity and a second sub-cavity. The second sub-cavity is in communication with the first sub-cavity. The second sub-cavity is positioned below the first heating member. The battery is positioned inside the second sub-cavity. The circuit board is positioned inside the first sub-cavity. The first sub-cavity is positioned in a front side of the inner container.

Furthermore, the base further includes a heat-insulating member disposed at a bottom portion of the inner container and forming a third cavity with the inner container. The first heating member is disposed in the third cavity.

Furthermore, the base further includes a display and a function button. The display and the function button are both electrically connected to the circuit board. The function button is positioned on a side of the display. The charging interface is positioned below the display. The display, the function button, and the charging interface are all arranged corresponding to a position of the first sub-cavity.

A cross-section of the cover body is in the shape of a capital letter "L".

The present invention has the following beneficial effects. Compared with the prior art, in the present invention, the first heating member is configured at the bottom portion of the inner container to heat the bottom portion of the inner container, and the second heating member is configured on an outer peripheral side of the inner container to heat the side wall of the inner container. In this way, when the food container is placed into the receiving slot from the opening, the base is capable of heating the food container from the bottom portion and the peripheral side of the food container, increasing a speed of heating the food in the food container and avoiding the problem of insufficient heating of food far away from the bottom portion of the food container. In addition, the top portion of the inner container is not exposed outside the outer shell to avoid touching the inner container when placing or taking the food container, thereby avoiding burns and improving product safety performance.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
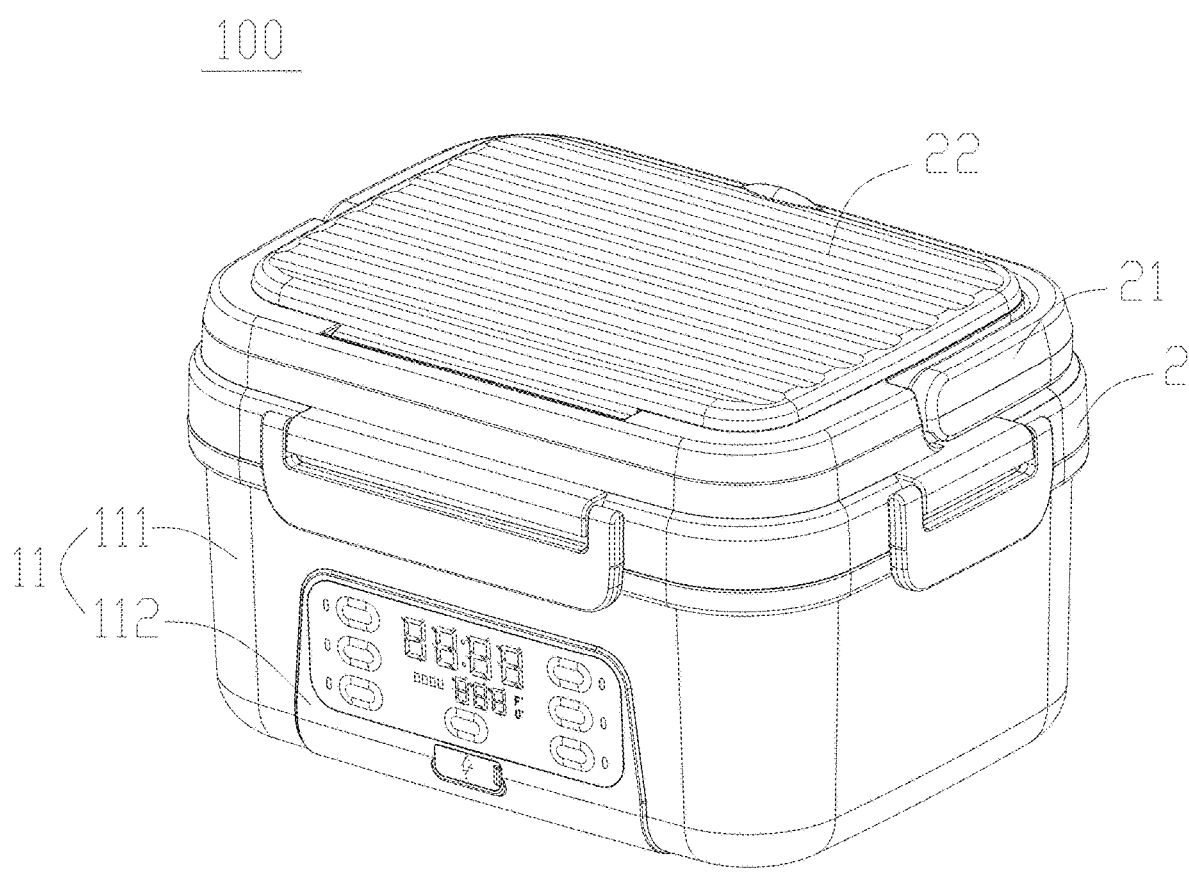
FIG. 1 is a perspective view of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
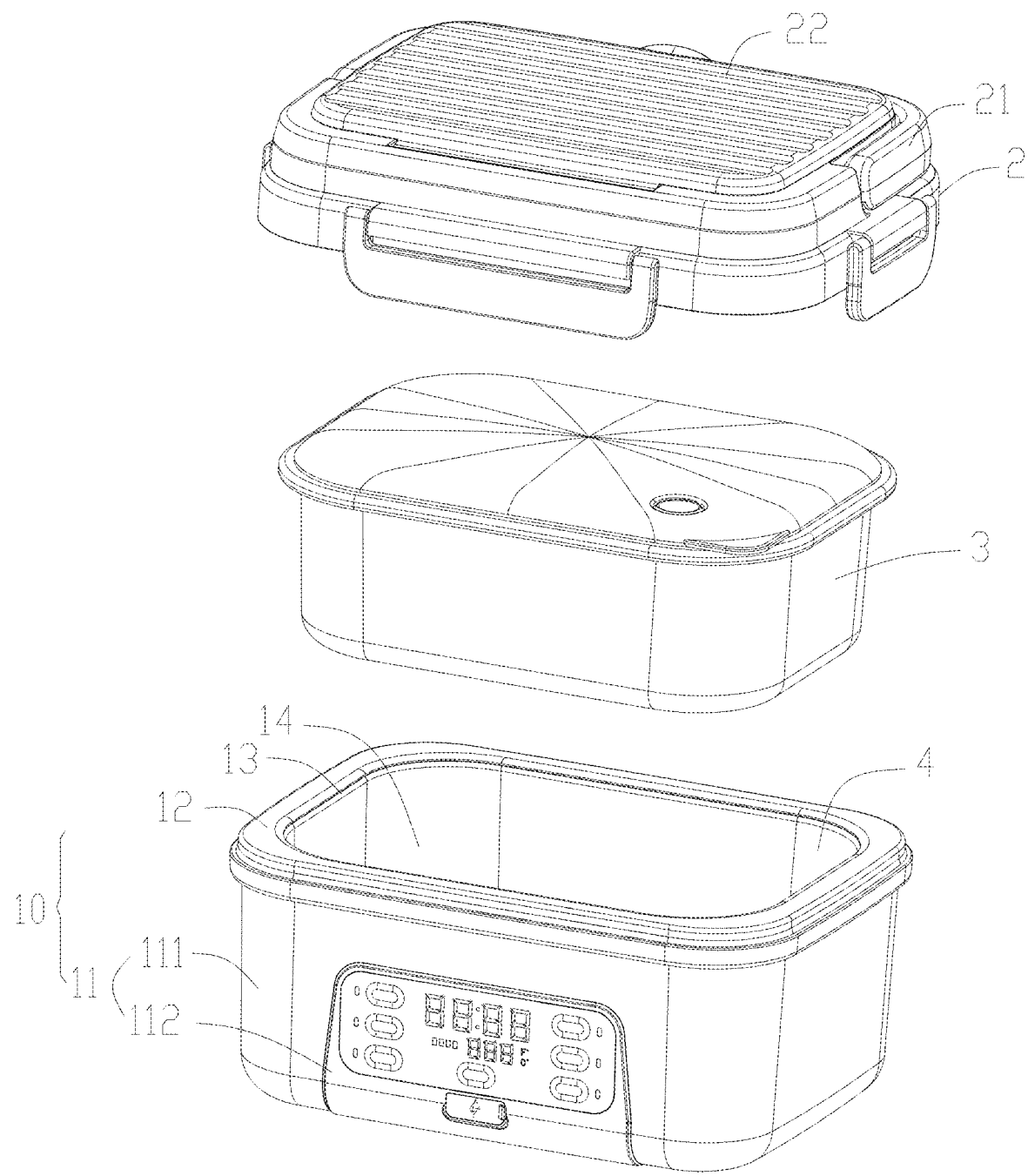
FIG. 2 is an exploded schematic diagram of a base and a food container of the present invention.
Figure 3:
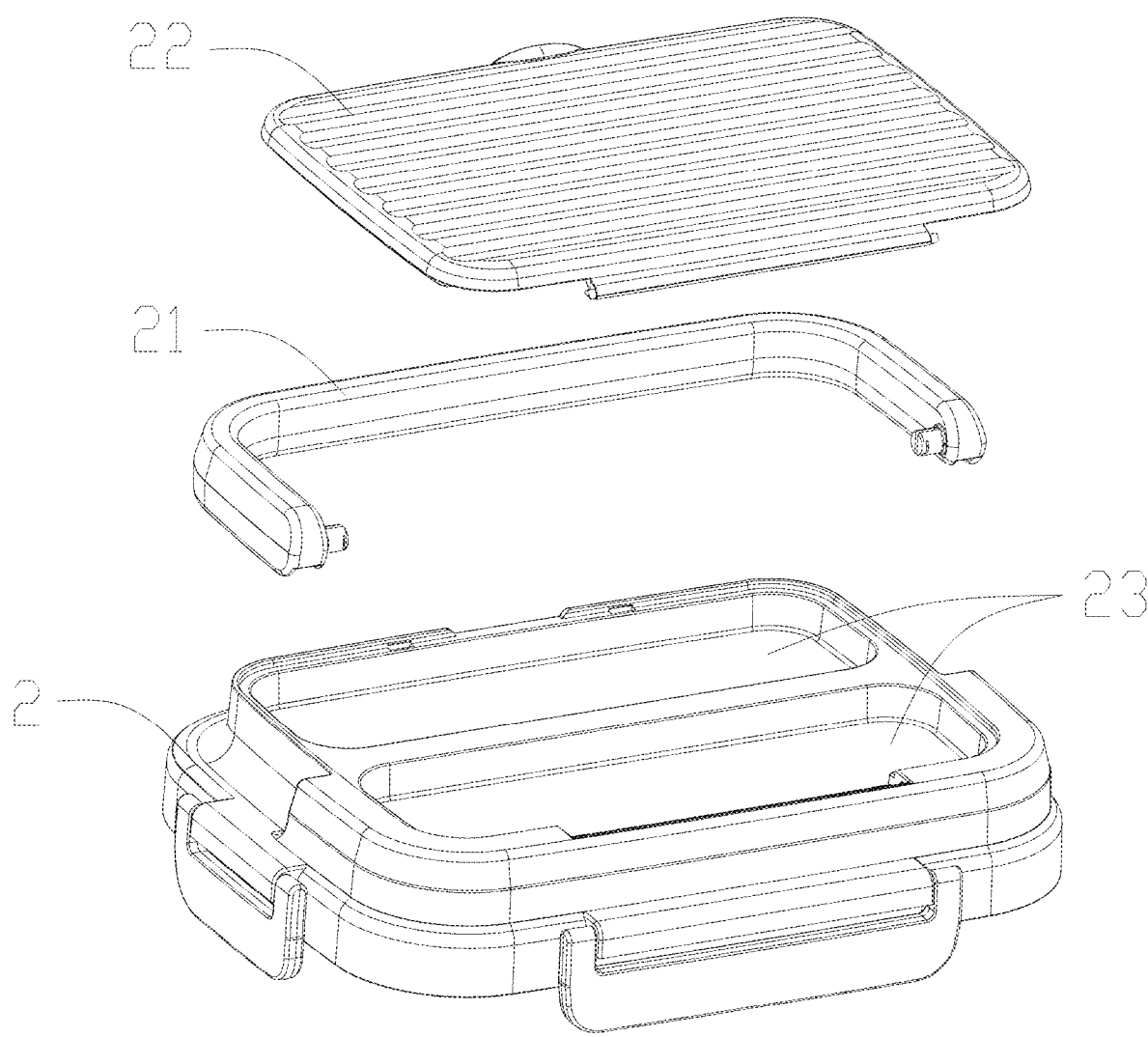
FIG. 3 is an exploded schematic diagram of a front cover, a flip cover, and a handle of the present invention.
Figure 4:
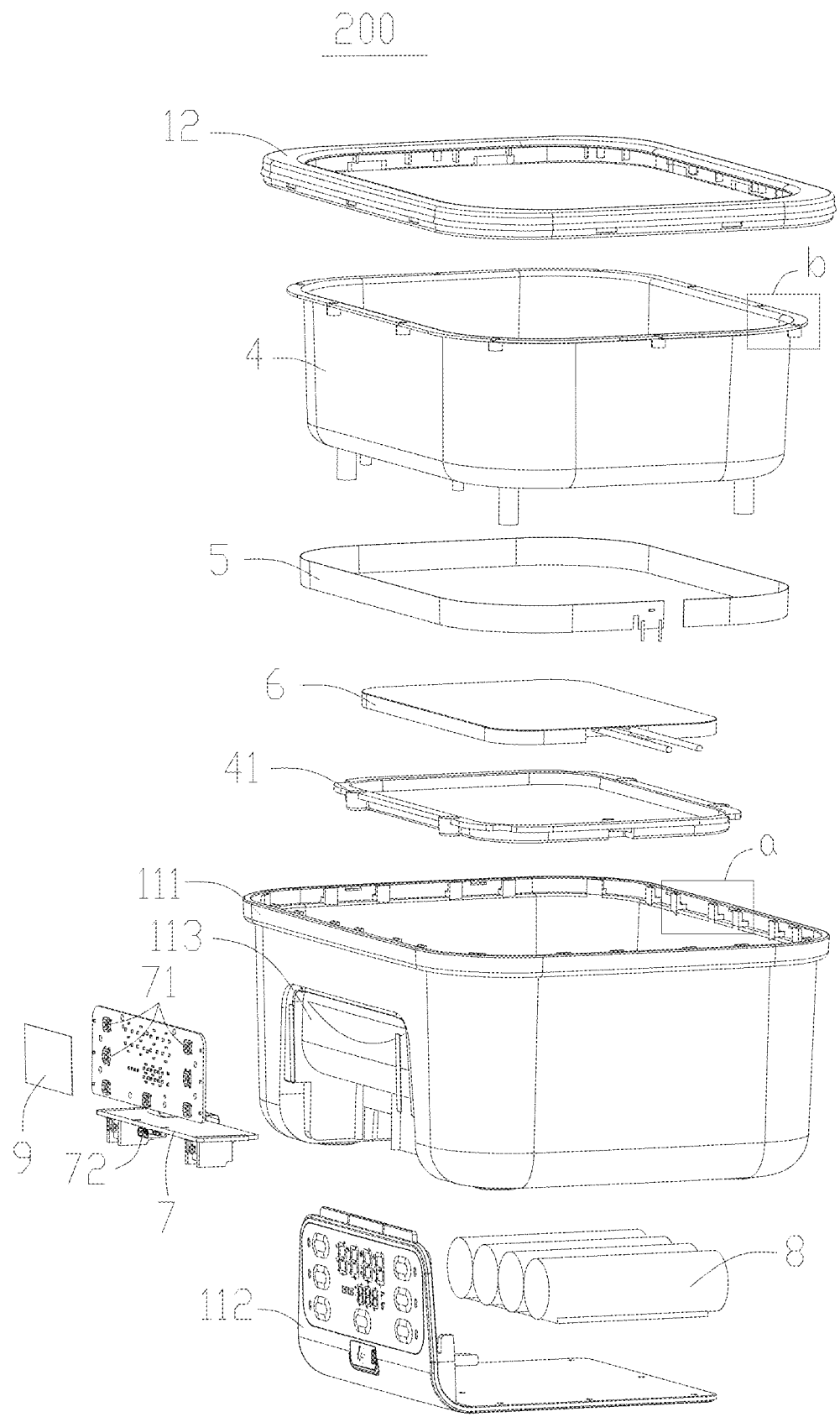
FIG. 4 is an exploded view of a base of the present invention after removing a front cover.
Figure 5:
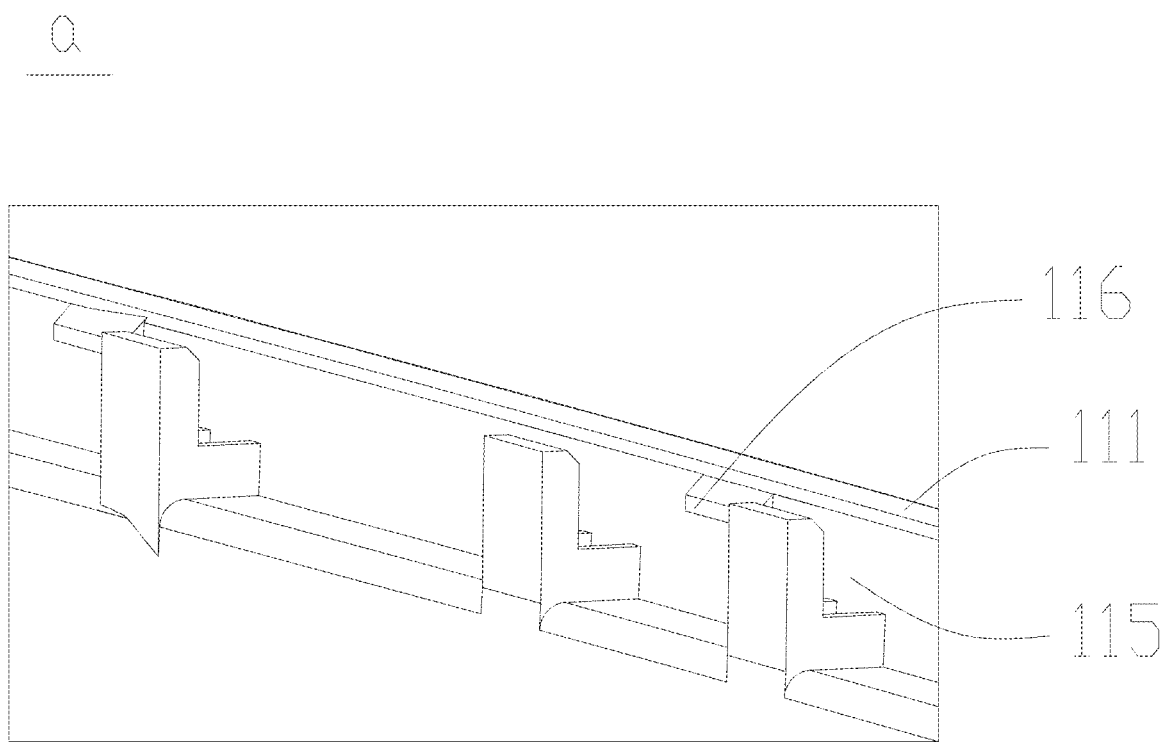
FIG. 5 is an enlarged view of area a in FIG. 4.
Figure 6:
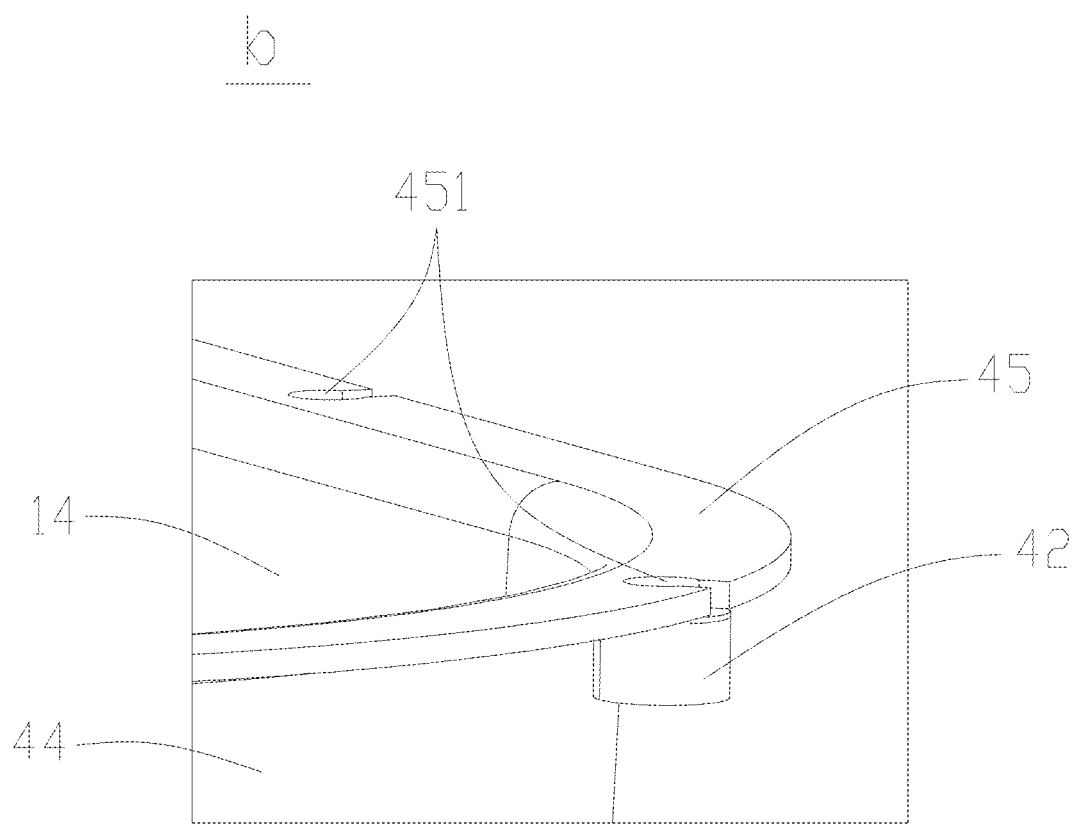
FIG. 6 is an enlarged view of area b in FIG. 4.
Figure 7:
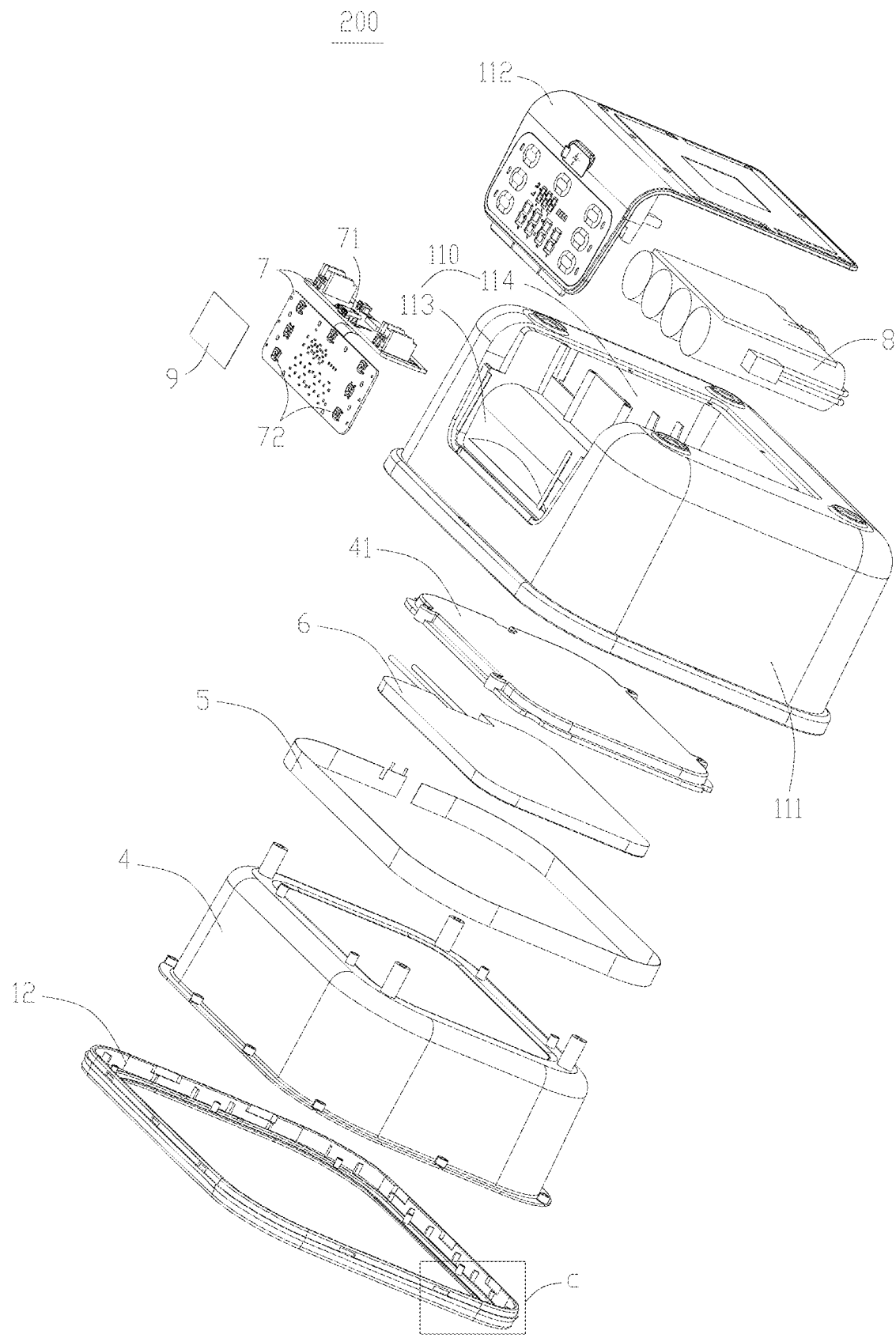
FIG. 7 is an exploded view of a base of the present invention from another angle of view after removing a front cover.
Figure 8:
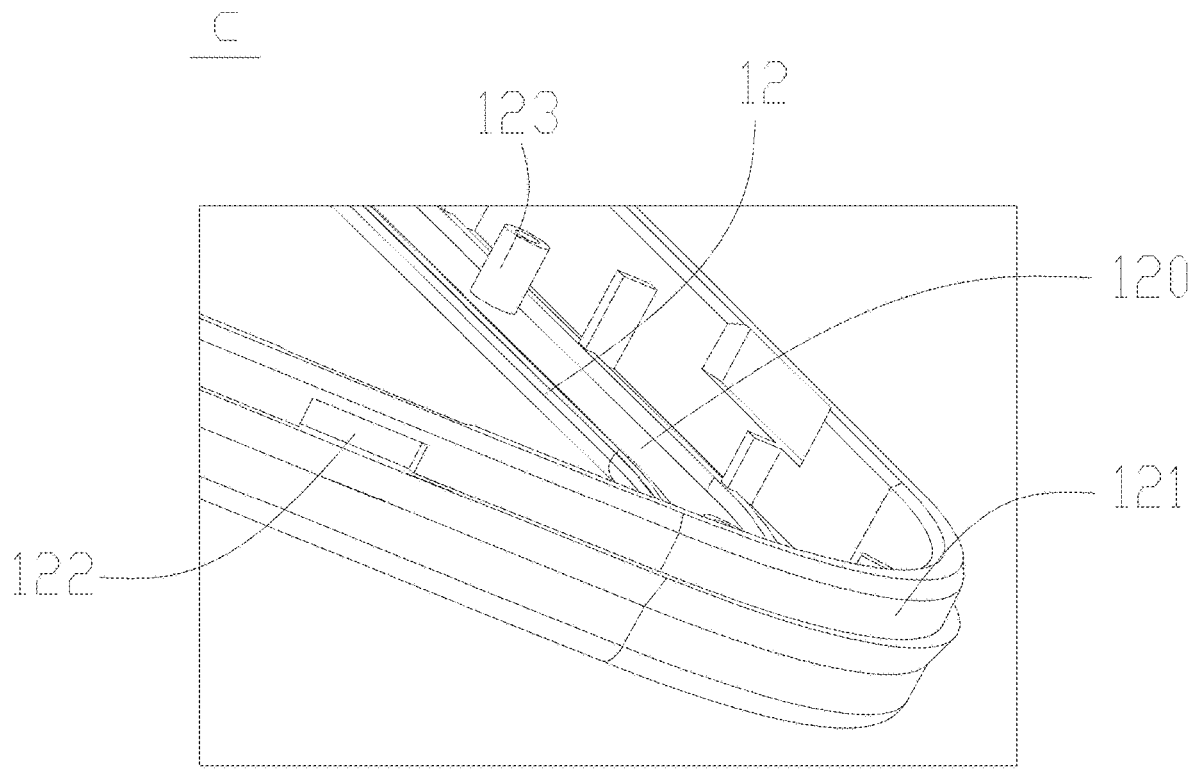
FIG. 8 is an enlarged view of area c in FIG. 7.
Figure 9:
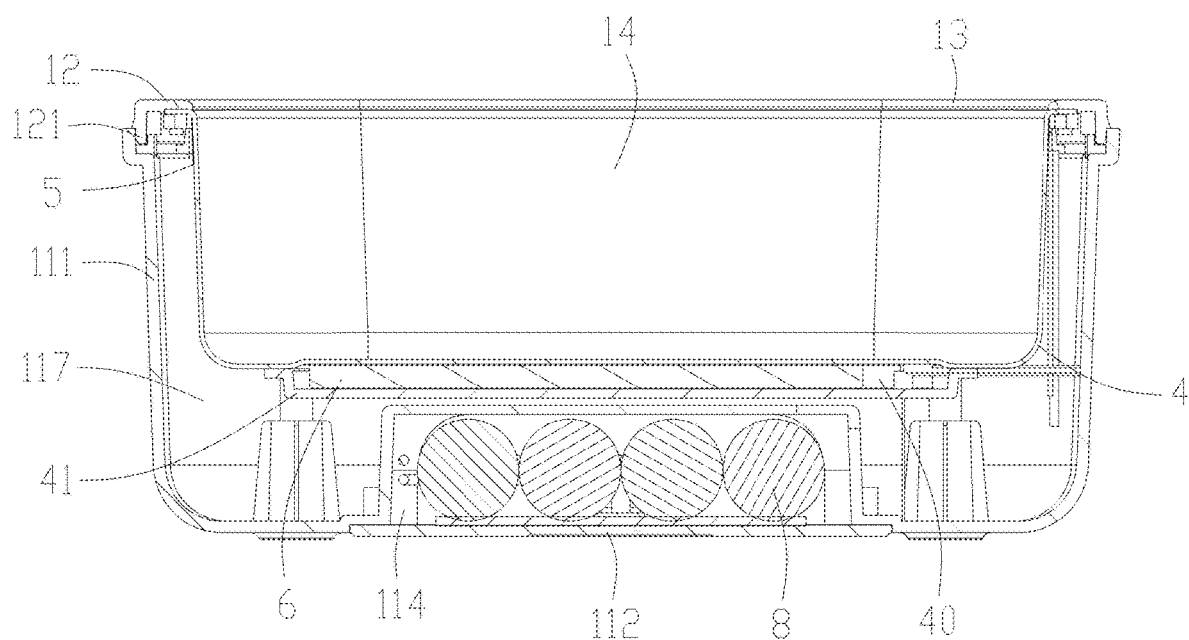
FIG. 9 is a cross-sectional view of a base of the present invention after removing a front cover and taken along a length direction of a top view.
Figure 10:
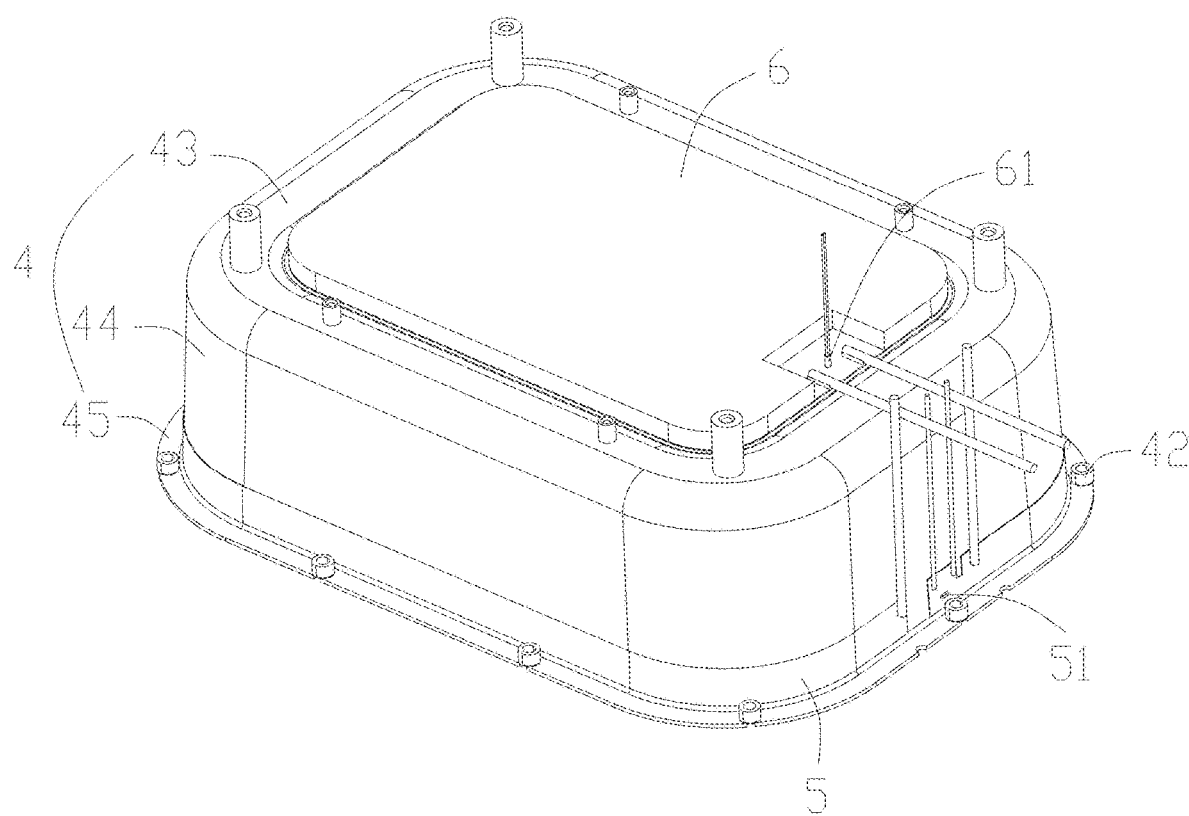
FIG. 10 is a schematic diagram of the assembly of a first heating member, a second heating member, a first temperature detection unit, a second temperature detection unit, and an inner container of the present invention.
Figure 11:
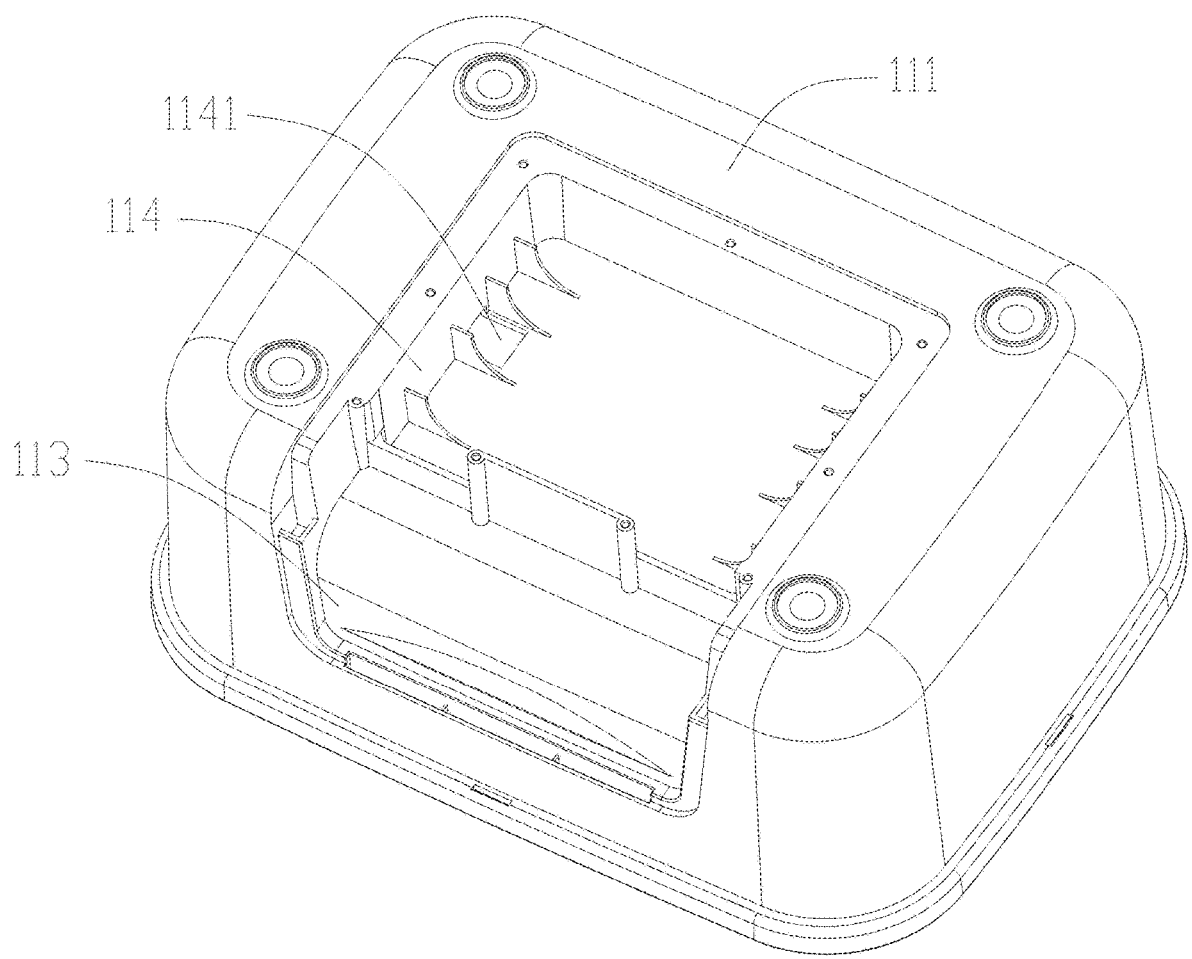
FIG. 11 is a structural diagram of a shell body of the present invention.

Referring to FIGS. 1-11, a heating lunch box 100 is provided in the present embodiment.

The heating lunch box 100 includes a base 200 and a food container 3. The food container 3 is used for holding food. The base 200 includes an outer shell 10, a circuit board 7, a first heating member 6, a second heating member 5, and an inner container 4. The circuit board 7, the first heating member 6, the second heating member 5, and the inner container 4 are arranged inside the outer shell 10. The inner container 4 is used for heat conduction. The first heating member 6 and the second heating member 5 are both electrically connected to the circuit board 7. A receiving slot 14 is defined in the inner container 4. A top portion of the receiving slot 14 is an opening 13. The first heating member 6 is disposed at a bottom portion of the inner container 4, and the second heating member 5 is disposed on an outer side wall of the inner container 4. A top portion of the inner container 4 does not protrude from a top surface of the outer shell 10.

In the present embodiment, the first heating member 6 is configured at the bottom portion of the inner container 4 to heat the bottom portion of the inner container 4, and the second heating member 5 is configured on an outer peripheral side of the inner container 4 to heat a side wall of the inner container 4. In this way, when the food container 3 is placed into the receiving slot 14 from the opening 13, the base 200 is capable of heating the food container 3 from a bottom portion and a peripheral side of the food container 3, increasing a speed of heating the food in the food container 3 and avoiding the problem of insufficient heating of food far away from the bottom portion of the food container 3. In addition, the top portion of the inner container 4 is not exposed outside the outer shell 10 to avoid touching the inner container 4 when placing or taking the food container 3, thereby avoiding burns and improving product safety performance.

Specifically, a material of the inner container 4 is preferably aluminum. The aluminum has good heat conduction performance. Of course, the material of the inner container 4 can also be stainless steel, ceramic, glass, etc.

The heating lunch box 100 further includes a front cover 2 detachably connected to the outer shell 10, so that when the food container 3 is placed in the receiving slot 14 for heating, the receiving slot 14 forms a closed cavity to prevent heat from flowing out and better heat the food container 3.

The front cover 2 and the outer shell 10 can be connected by a buckle, and the front cover 2 can also be provided with grooves 23 for receiving tableware. The tableware can be chopsticks, spoons, forks, straws, etc. The front cover 2 is equipped with a flip cover 22 at a position corresponding to the groove 23. A first side of the flip cover 22 is rotatably connected to the front cover 2, and a second side of the flip cover 22 is connected to the front cover 2 via magnetic attraction or a buckle. After the flip cover 22 is opened, it is convenient for a user to take the tableware. When the flip cover 22 is closed, the position of the tableware can be limited, making it convenient for a user to carry the heating lunch box 100 of the present embodiment. Furthermore, a handle 21 is also rotatably arranged on the front cover 2 or the outer shell 10, making it convenient for the user to hold the handle 21 when going out. When the handle 21 is not in use, the handle 21 can be placed horizontally on the front cover 2 or the outer shell 10.

A total number of the second heating members 5 is one, and the second heating member 5 is arranged around the outer side wall of the inner container 4. When the second heating member 5 is heated, a peripheral side of the inner container 4 can be heated, combined with a heat conduction effect of the inner container 4 and the heating of the first heating member 6, to achieve heating of the entire peripheral side and the bottom portion of the food container 3, thereby effectively accelerating a heating rate of the food container 3 and heating the food more evenly. In this embodiment, the second heating member 5 is a flexible heating sheet, such as a PET electric heating film, an FPC electric heating film, a silicone electric heating film, etc. Of course, in other embodiments, a total number of the second heating members 5 can also be multiple, and the second heating members 5 are arranged around the outer side wall of the inner container 4.

In this embodiment, the second heating member 5 can be a flexible heating sheet or a PCT heating sheet, etc. In order to effectively improve a heating effect of the inner container 4, the second heating member 5 can be configured at a middle position of the outer side wall of the inner container 4 or an upper-middle position of a height of the inner container 4. Combined with the heating effect of the first heating member 6 and the heat conduction effect of the inner container 4, the temperature of the entire inner container 4 can be raised more rapidly, and the overall temperature of the inner container 4 can be made more uniform.

The first heating member 6 can be a flexible heating sheet or a PCT heating sheet. The first heating member 6 occupies at least one-third of a bottom surface area of the inner container 4, so as to increase a contact surface between the first heating member 6 and the inner container 4 on a bottom surface, thereby better heating the bottom portion of the inner container 4, and increasing the heating effect. Of course, in other embodiments, when a total number of the first heating members 6 is multiple, the first heating members 6 can be evenly distributed at the bottom portion of the inner container 4, which can also better heat the bottom portion of the inner container 4 and make the heating effect more uniform.

In further design, the base 200 further includes a first temperature detection unit 61 arranged inside the outer shell 10. The circuit board 7 is electrically connected to the first temperature detection unit 61. The first temperature detection unit 61 is used for detecting a temperature of one of the inner container 4, the first heating member 6, and the second heating member 5. By using the first temperature detection unit 61 to detect the temperature, when the circuit board 7 receives an electrical signal fed back by the first temperature detection unit 61, the circuit board 7 controls the activation or deactivation of at least one of the first heating member 6 and the second heating member 5. In this way, the first heating member 6 and the second heating member 5 can be controlled to maintain a constant temperature during heating, achieving the effect that the base 200 provides constant temperature heating for the food container 3.

In further design, the first temperature detection unit 61 is arranged at a bottom portion of the inner container 4 for detecting a heating temperature of the first heating member 6 or a temperature of the bottom portion of the inner container 4. The base 200 further includes a second temperature detection unit 51 arranged inside the outer shell 10. The second temperature detection unit 51 is electrically connected to the circuit board 7. The second temperature detection unit 51 is arranged on an outer side wall of the inner container 4. The second temperature detection unit 51 is used for detecting a heating temperature of the second heating member 5 or a temperature of a side wall of the inner container 4, so as to better control the temperature of the first heating member 6 and the second heating member 5, and to better control the temperature of the bottom portion and the side wall of the inner container 4.

The first temperature detection unit 61 and the second temperature detection unit 51 can be temperature sensors or thermistors, etc. A total number of the second temperature detection units 51 is one. Of course, in other embodiments, a total number of the second temperature detection units 51 can also be multiple, and the second temperature detection units 51 are distributed around the outer side wall of the inner container 4. The circuit board 7 is capable of activating or deactivating the second heating member 5 when a temperature fed back by one of the plurality of second temperature detection units 51 is lower or higher than a preset value, so as to better control the temperature of the side wall of the inner container 4. Moreover, to detect the temperature of the inner container 4, the second temperature detection unit 51 can be arranged at a middle position of the side wall of the inner container 4 or at a position higher than half of a height of the outer side wall of the inner container 4, so as to prevent the temperature near the top portion of the inner container 4 from failing to reach a preset temperature.

The circuit board 7 is configured for controlling the activation and deactivation of the first heating member 6 according to a first temperature signal fed back by the first temperature detection unit 61. The circuit board 7 is configured for controlling the activation and deactivation of the second heating member 5 based on a second temperature signal fed back by the second temperature detection unit 51. That is, the first heating member 6 and the second heating member 5 are controlled separately, which can make the overall temperature of the inner container 4 more uniform. Of course, in other embodiments, the circuit board 7 can also simultaneously control the activation or deactivation of the first heating member 6 and the second heating member 5 based on one of a first temperature signal fed back by the first temperature detection unit 61 and a second temperature signal fed back by the second temperature detection unit 51. It should be understood that the circuit board 7 determines the heating temperatures of the first heating member 6 and the second heating member 5 based on the first temperature signal and the second temperature signal, respectively. When the temperature of the first heating member 6 or the second heating member 5 is less than or greater than the preset temperature, the first heating member 6 and the second heating member 5 are controlled to stop heating or start heating simultaneously.

In one embodiment, the outer shell 10 includes an outer cover 11 and a front frame 12 connected to the outer cover 11. The front frame 12 is positioned at a top portion of the outer cover 11. The inner container 4 is positioned on an inner side of the outer shell 10 and below the front frame 12. That is, the entire outer side wall of the inner container 4 is wrapped by the outer shell 10, and the top portion of the inner container 4 is not exposed beyond the top portion of the outer shell 10, effectively preventing the user from touching the inner container 4 and getting burned, thereby improving the safety performance of the product.

In one embodiment, an outer peripheral side of the front frame 12 extends downward to form an outer surrounding wall 121. A top portion of the outer cover 11 is provided with an insertion slot 115 and an engaging block 116. The outer surrounding wall 121 is provided with an engaging opening 122. At least one part of the outer surrounding wall 121 is placed in the insertion slot 115. The engaging block 116 is placed in the engaging opening 122 to connect the front frame 12 with the outer cover 11. Of course, in other embodiments, the front frame 12 and the outer cover 11 can also be connected by screws, ultrasonic welding, gluing, other buckles, and so on.

In one embodiment, the inner container 4 includes a heat-conducting bottom plate 43, a heat-conducting surrounding wall 44 extending upward from a circumferential side of the heat-conducting bottom plate 43, and an outer rim 45 extending outward from a top portion of the heat-conducting surrounding wall 44. A position limiting slot 120 is defined in a bottom surface of the front frame 12. The outer rim 45 is placed inside the position limiting slot 120 to limit the inner container 4.

Specifically, a bottom portion of the front frame 12 is equipped with positioning columns 123, and the outer rim 45 is provided with positioning holes 451 at positions corresponding to the positioning columns 123. The positioning columns 123 pass through the positioning holes 451. The base 200 further includes pressing members 42, and the pressing members 42 are sleeved onto the positioning columns 123 to press the outer rim 45 onto the front frame 12. The pressing member 42 can be screwed onto the positioning column 123, or an inner side wall of the pressing member 42 is threadedly engaged with an outer side wall of the positioning column 123 to achieve the fixation between the pressing member 42 and the positioning column 123, or the pressing member 42 and the positioning column 123 can be fixed by a buckle, a pin, etc. The pressing member 42 can be integrated with the inner container 4, or disposed separately from the inner container 4. Of course, in other embodiments, the outer rim 45 can be connected and fixed to the front frame 12 through the engaging block 116, a screw, or the like. In other embodiments, the inner container 4 may not include the outer rim 45.

In one embodiment, the outer cover 11 includes a shell body 111 connected to the front frame 12, and a cover body 112 connected to the shell body 111. The shell body 111, the front frame 12, and the inner container 4 surround to form a first cavity 117. The shell body 111 and the cover body 112 are connected to form a second cavity 110. A wire passing hole 1141 is defined in the shell body 111. The circuit board 7 is disposed in the second cavity 110. The first heating member 6 and the second heating member 5 are both positioned in the first cavity 117, so that the circuit board 7 is separated from the first heating member 6 and the second heating member 5, preventing the circuit board 7 from overheating and affecting operation.

In one embodiment, the base 200 further includes a battery 8. The battery 8 is arranged in the second cavity 110 and electrically connected to the circuit board 7. The battery 8 is used for supplying power to the circuit board 7, so that the heating lunch box 100 of the present embodiment can be conveniently carried and used when going out, for example, heating food outdoors. The battery 8 can be a non-rechargeable battery 8, such as a dry battery 8, etc. Alternatively, the battery 8 can also be a rechargeable battery 8, that is, the shell body 111 or the cover body 112 is provided with charging interfaces 72 for connecting to an external power supply. The charging interface 72 is electrically connected to the circuit board 7, so that when the charging interface 72 is connected to the power supply, the battery 8 can be charged through the circuit board 7.

Specifically, the second cavity 110 includes a first sub-cavity 113 and a second sub-cavity 114. The second sub-cavity 114 is in communication with the first sub-cavity 113. The second sub-cavity 114 is positioned below the first heating member 6. The battery 8 is positioned inside the second sub-cavity 114. The circuit board 7 is positioned inside the first sub-cavity 113. The first sub-cavity 113 is positioned in a front side of the inner container 4. The positions of the circuit board 7 and the battery 8 are reasonably configured to reduce the product volume.

A cross-section of the cover body 112 is in the shape of a capital letter "L". The base 200 further includes a display 9 and a function button 71. The display 9 and the function button 71 are both electrically connected to the circuit board 7. The function button 71 is positioned on a side of the display 9. The charging interface 72 is positioned below the display 9. The display 9, the function button 71, and the charging interface 72 are all arranged corresponding to a position of the first sub-cavity 113, that is, the display 9, the function button 71, and the charging interface 72 are all distributed on a side wall of the base 200, making it convenient for the user to view the content displayed on the display 9, operate the function button 71, and use the charging interface 72. The display 9 can be used for displaying time, a heating temperature of the first heating member 6, a heating temperature of the second heating member 5, a heating time, and the like. The function button 71 can be used by the user to control the activation, the deactivation, the temperature, and the heating time of the first heating member 6 and the second heating member 5.

In one embodiment, the base 200 further includes a heat-insulating member 41 disposed at a bottom portion of the inner container 4 and forming a third cavity 40 with the inner container 4. The first heating member 6 is disposed in the third cavity 40 to reduce the transfer of the heat generated by the first heating member 6 to the second sub-cavity 114, thus preventing the battery 8 from being damaged.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A heating lunch box, comprising:
a base; and
a food container for holding food;
wherein the base comprises an outer shell, a circuit board, a first heating member, a second heating member, and an inner container; the circuit board, the first heating member, the second heating member, and the inner container are arranged inside the outer shell; the inner container is used for heat conduction; and the first heating member and the second heating member are both electrically connected to the circuit board;
a receiving slot is defined in the inner container; a top portion of the receiving slot is an opening; the first heating member is disposed at a bottom portion of the inner container; the second heating member is disposed on an outer side wall of the inner container; and a top portion of the inner container does not protrude from a top surface of the outer shell;
wherein the base further comprises a first temperature detection unit arranged inside the outer shell; the circuit board is electrically connected to the first temperature detection unit; and the first temperature detection unit is used for detecting a temperature of one of the inner container, the first heating member, and the second heating member;
wherein the outer shell comprises an outer cover and a front frame connected to the outer cover; the front frame is positioned at a top portion of the outer cover; and the inner container is positioned on an inner side of the outer shell and below the front frame;
wherein the inner container comprises a heat-conducting bottom plate, a heat-conducting surrounding wall extending upward from a circumferential side of the heat-conducting bottom plate, and an outer rim extending outward from a top portion of the heat-conducting surrounding wall; a position limiting slot is defined in a bottom surface of the front frame; and the outer rim is placed inside the position limiting slot.

2. The heating lunch box according to claim 1, wherein the first temperature detection unit is arranged at the bottom portion of the inner container for detecting a heating temperature of the first heating member or a temperature of the bottom portion of the inner container;
the base further comprises a second temperature detection unit arranged inside the outer shell; the second temperature detection unit is electrically connected to the circuit board; the second temperature detection unit is arranged on the outer side wall of the inner container; and the second temperature detection unit is used for detecting a heating temperature of the second heating member or a temperature of the outer side wall of the inner container.

3. The heating lunch box according to claim 1, wherein the second heating member is a flexible heating sheet; a total number of the second heating members is one; and the second heating member is arranged around the outer side wall of the inner container.

4. The heating lunch box according to claim 1, wherein a total number of the second heating members is multiple; and the second heating members are arranged around the outer side wall of the inner container.

5. The heating lunch box according to claim 1, wherein the first heating member occupies at least one-third of a bottom surface area of the inner container.

6. The heating lunch box according to claim 2, wherein a total number of the second temperature detection unit is one.

7. The heating lunch box according to claim 2, wherein a total number of the second temperature detection unit is multiple; and the multiple second temperature detection units are distributed around the outer side wall of the inner container.

8. The heating lunch box according to claim 2, wherein the second temperature detection unit is arranged at a position higher than half of a height of the outer side wall of the inner container.

9. The heating lunch box according to claim 2, wherein the circuit board is configured for controlling the activation and deactivation of the first heating member according to a first temperature signal fed back by the first temperature detection unit; and the circuit board is configured for controlling the activation and deactivation of the second heating member based on a second temperature signal fed back by the second temperature detection unit.

10. The heating lunch box according to claim 2, wherein the circuit board is configured for simultaneously controlling the activation and deactivation of the first heating member and the second heating member based on one of a first temperature signal fed back by the first temperature detection unit and a second temperature signal fed back by the second temperature detection unit.

11. The heating lunch box according to claim 1, wherein an outer peripheral side of the front frame extends downward to form an outer surrounding wall; a top portion of the outer cover is provided with an insertion slot; a side wall of the insertion slot is provided with an engaging block; the outer surrounding wall is provided with an engaging opening; at least one part of the outer surrounding wall is placed in the insertion slot; and the engaging block is placed in the engaging opening.

12. The heating lunch box according to claim 1, wherein a bottom portion of the front frame is equipped with positioning columns; the outer rim is provided with positioning holes at positions corresponding to the positioning columns; the positioning columns pass through the positioning holes; the base further comprises pressing members; and the pressing members are sleeved onto the positioning columns to press the outer rim onto the front frame.

13. The heating lunch box according to claim 1, wherein the outer cover comprises a shell body connected to the front frame, and a cover body connected to the shell body; the shell body, the front frame, and the inner container surround to form a first cavity; the shell body and the cover body are connected to form a second cavity; a wire passing hole is defined in the shell body; the circuit board is disposed in the second cavity; and the first heating member and the second heating member are both positioned in the first cavity.

14. The heating lunch box according to claim 13, wherein the base further comprises a battery; and the battery is arranged in the second cavity and electrically connected to the circuit board;
the shell body or the cover body is provided with a charging interface for connecting to an external power supply; and the charging interface is electrically connected to the circuit board.

15. The heating lunch box according to claim 14, wherein the second cavity comprises a first sub-cavity and a second sub-cavity; the second sub-cavity is in communication with the first sub-cavity; the second sub-cavity is positioned below the first heating member; the battery is positioned inside the second sub-cavity; the circuit board is positioned inside the first sub-cavity; and the first sub-cavity is positioned in a front side of the inner container.

16. The heating lunch box according to claim 15, wherein the base further comprises a heat-insulating member disposed at a bottom portion of the inner container and forming a third cavity with the inner container; and the first heating member is disposed in the third cavity.

17. The heating lunch box according to claim 15, wherein the base further comprises a display and a function button; the display and the function button are both electrically connected to the circuit board; the function button is positioned on a side of the display; the charging interface is positioned below the display; and the display, the function button, and the charging interface are all arranged corresponding to a position of the first sub-cavity; a cross-section of the cover body is in the shape of a capital letter "L".

18. A heating lunch box, comprising:
a base; and
a food container for holding food;
wherein the base comprises an outer shell, a circuit board, a first heating member, a second heating member, and an inner container; the circuit board, the first heating member, the second heating member, and the inner container are arranged inside the outer shell; the inner container is used for heat conduction; and the first heating member and the second heating member are both electrically connected to the circuit board;
a receiving slot is defined in the inner container; a top portion of the receiving slot is an opening; the first heating member is disposed at a bottom portion of the inner container; the second heating member is disposed on an outer side wall of the inner container; and a top portion of the inner container does not protrude from a top surface of the outer shell;
wherein the outer shell comprises an outer cover and a front frame connected to the outer cover; the front frame is positioned at a top portion of the outer cover; and the inner container is positioned on an inner side of the outer shell and below the front frame;
wherein an outer peripheral side of the front frame extends downward to form an outer surrounding wall; a top portion of the outer cover is provided with an insertion slot; a side wall of the insertion slot is provided with an engaging block; the outer surrounding wall is provided with an engaging opening; at least one part of the outer surrounding wall is placed in the insertion slot; and the engaging block is placed in the engaging opening.

19. A heating lunch box, comprising:
a base; and
a food container for holding food;
wherein the base comprises an outer shell, a circuit board, a first heating member, a second heating member, and an inner container; the circuit board, the first heating member, the second heating member, and the inner container are arranged inside the outer shell; the inner container is used for heat conduction; and the first heating member and the second heating member are both electrically connected to the circuit board;
a receiving slot is defined in the inner container; a top portion of the receiving slot is an opening; the first heating member is disposed at a bottom portion of the inner container; the second heating member is disposed on an outer side wall of the inner container; and a top portion of the inner container does not protrude from a top surface of the outer shell;
wherein the outer shell comprises an outer cover and a front frame connected to the outer cover; the front frame is positioned at a top portion of the outer cover; and the inner container is positioned on an inner side of the outer shell and below the front frame;
wherein the inner container comprises a heat-conducting bottom plate, a heat-conducting surrounding wall extending upward from a circumferential side of the heat-conducting bottom plate, and an outer rim extending outward from a top portion of the heat-conducting surrounding wall; a position limiting slot is defined in a bottom surface of the front frame; and the outer rim is placed inside the position limiting slot.

* * * * *